3,394,878
AZEOTROPIC COMPOSITIONS
Bernhardt J. Eiseman, Jr., Wilmington, Del., assignor to E. I. du Pont de Nemours and Company, Wilmington, Del., a corporation of Delaware
No Drawing. Filed Aug. 25, 1965, Ser. No. 482,624
1 Claim. (Cl. 252—67)

ABSTRACT OF THE DISCLOSURE

A composition useful as a refrigerant in a refrigeration cycle. The composition is the heterogeneous azeotrope of $CF_3OCH_3$ and $CF_3OC_2F_5$, $CF_3OCH_2CF_3$ and $CF_2Cl$—$CF_2Cl$, or $CF_3OCF_3$ and $CF_3Br$.

---

This invention is directed to compositions adapted for use as refrigerants. More particularly, the present invention is directed to novel refrigerants comprising constant-boiling mixtures of selected fluoroethers and mixtures of particular fluoroethers with a selected fluorohalocarbon.

A widely used class of refrigerants is the low-boiling fluorine compounds, particularly fluorine derivatives of methane and ethane. Although these compounds are very attractive refrigerants, they leave room for improvement in one property or another. Among the favorable properties possessed by these useful refrigerants are low toxicity, nonflammability, freedom from odor and high chemical and thermal stability. Properties in which these known refrigerants are deficient and in which an improvement would advance the art of refrigeration are compression ratio and latent heat of vaporization.

Moreover, although these existing refrigerants exhibit a wide range of boiling points from −198° F. for carbon tetrafluoride through −115° F. for trifluoromethane to 199° F. for 1,1,2,2-tetrachlorodifluoroethane, gaps occur within this broad range, and refrigeration temperatures within these gaps are not readily attained with available refrigerants. For example, no refrigerant is available having a boiling point between −72° F., the boiling point of bromotrifluoromethane, and −109° F., the boiling point of hexafluoroethane. Hence, there is always a need for refrigerant compositions possessing boiling points not possessed by other existing refrigerant compositions.

In a refrigeration cycle established to effect cooling on a body at some specific temperature, heat is removed from the body by evaporating a refrigerant liquid near the body in an evaporator. The heat removed from the body is absorbed by the evaporator to evaporate the liquid. This heat is given up by condensing the vapors through a compressor and condenser installation, the condenser using a cooling medium, usually the ambient air or water. The condensed liquid is then returned to the evaporator and the cycle continuously repeated. The condensing temperature must be somewhat higher than that of the cooling medium. The vapor pressure of the refrigerant at this condensing temperature is referred to as the "high-side pressure." The vapor pressure of the refrigerant at the evaporator temperature is referred to as the "low-side pressure." The ratio of the absolute high-side pressure to the absolute low-side pressure is known as the "ratio of compression." For higher refrigerating efficiency and efficient operation of the compressor a low ratio of compression is desirable, other conditions being equal.

A high latent heat of vaporization is also desirable for refrigeration, cooling, and air-conditioning operations because it reduces the quantity of refrigerant needed in the cycle. A reduction in the quantity of refrigerant used is an economic saving, not only in the cost of the refrigerant, but also in the cost of the equipment, since smaller size equipment can be used. Practice has shown that usually smaller and less costly piping and other handling equipment is also required for a refrigerant having a high latent heat of vaporization.

The Clapeyron equation relates the latent heat of vaporization to the slope of the vapor pressure curve in such a way that a high slope of the vapor pressure curve in the sense of a rapid rise of pressure with temperature usually results in a high latent heat of vaporization. A rapid rise of pressure with temperature also implies a high ratio of compression. In certain heterogeneous azeotropes, a rapid rise in the vapor pressure with temperature at evaporator temperatures has been discovered so that there is the desired high latent heat of vaporization for the azeotrope composition at these temperatures. At higher temperatures the increased mutual solubility of the components of the heterogeneous mixture may result in less deviation from Raoult's law and a smaller rate of increase in vapor pressure with increase in temperature than would otherwise occur at the higher condensing temperatures. Hence, with selected heterogeneous azeotropes, it has been discovered that the ratio of compression may be relatively low even though the latent heat of vaporization at the condenser temperature is high.

It is, therefore, an object of this invention to provide new compositions suitable for use as refrigerants.

It is another object to provide refrigerant compositions having desirable boiling points, high latent heats of vaporization and low ratios of compression.

These and other objects will become apparent from the following description and claim.

More specifically, the present invention is directed to the following novel heterogeneous azeotropes:

(a) trifluoromethyl methyl ether and trifluoromethyl pentafluoroethyl ether, (b) trifluoromethyl 2,2,2-trifluoroethyl ether and 1,2-dichlorotetrafluoroethane, and (c) bis(trifluoromethyl) ether and bromotrifluoromethane.

The present invention is also directed to a novel process for transferring heat in a refrigerating cycle which comprises evaporating, compressing, and condensing in the cycle a heterogeneous azeotrope as hereinbefore described.

A heterogeneous azeotrope is a composition of two liquids which are immiscible or only partially miscible and when mixed form two liquid phases. The composition is further characterized as exhibiting an essentially constant boiling temperature over a range of compositions; the vapor in equilibrium with the two liquid phases condenses to form the same two liquid phases and no change in the vapor pressure properties of the mixture occurs as a result of evaporation. Heterogeneous azeotropes are always minimum boiling.

In such compositions as those of the present invention wherein the components at a given temperature are only partially miscible there exists a heterogeneous azeotrope over the entire range of compositions where the two liquid phases and the vapor phase are at equilibrium. Thus, as long as two liquid phases are present, the composition will boil at a substantially constant temperature and give a constant vapor composition for the two liquid phase system. As the temperature is increased, the mutual solubility of the components of the composition also generally increases. As the mutual solubility thus increases, the deviation of the partial pressure of either component from Raoult's law decreases so that the vapor pressure of the mixture at higher temperatures is, proportionately, not so much above that of the components as at lower temperatures. A lower ratio of compression may thus be exhibited by the mixture than by a single refrigerant having the same evaporator pressure.

A heterogeneous azeotrope which exhibits a large effect of this type and has a desirably low ratio of compression is a composition consisting of a mixture of trifluoromethyl methyl ether and trifluoromethyl pentafluoroethyl ether. A preferred range of compositions for this azeotrope is that in which the mole percent of trifluoromethyl methyl ether is from 20 to 80. A most preferred range of compositions for this azeotrope is that in which the mole percent of trifluoromethyl methyl ether in the mixture is from about 35 to about 57. Compositions within this most preferred range have a normal boiling point of −22° F. (−30° C.) compared with the normal boiling point of −11° F. (−24° C.) of trifluoromethyl methyl ether and the normal boiling point of −10° F. (−23.3° C.) of trifluoromethyl pentafluoroethyl ether. An 11° F. (6° C.) depression in the boiling point as compared with the lowest boiling component is most surprising and represents a unique advantage when this composition is used as a refrigerant, since the lower boiling point of the azeotrope composition gives a greater compressor capacity at a given evaporator temperature.

A comparison of this invention heterogeneous azeotrope with dichlorodifluoromethane which has the same boiling temperature (−22° F.) in latent heat of vaporization and compression ratio shows significant advantages of the azeotrope in these properties, particularly in the ratio of compression. Exemplary experimental data are presented below in Table I. The latent heats of vaporization were calculated from the slope of the vapor pressure curves at the evaporator temperature by using the Clausius-Clapeyron equation.

TABLE I.—COMPARISON OF $CF_3OCH_3/CF_3OC_2F_5$ HETEROGENEOUS AZEOTROPE WITH $CCl_2F_2$ (R–12)
[Evaporate at −45° F., and 7.8 to 7.9 p.s.i.a. Condense at 70° F.]

|  | Latent Heat of Vaporization, B.t.u./lb. mole (calc'd) | Ratio of Compression |
|---|---|---|
| $CF_3OCH_3/CF_3OC_2F_5$ | 9,430 | 8.25 |
| $CCl_2F_2$ | 9,170 | 10.41 |

The ratio of compression of the heterogeneous azeotrope is particularly favorable for improved refrigeration performance compared with dichlorodifluoromethane. These improvements are a property of the entire range of heterogeneity of the mixture of $CF_3OCH_3$ and $$CF_3OC_2F_5$$

The heterogeneous azeotrope of trifluoromethyl 2,2,2-trifluoroethyl ether and 1,2-dichlorotetrafluoroethane (R–114) is characterized by a markedly larger heat of vaporization and a lower ratio of compression than the component 1,2 - dichlorotetrafluoroethane (R–114). These advantages are illustrated by comparing the azeotrope with 1,2-dichlorotetrafluoroethane as shown below in Table II. A preferred range of compositions of this heterogeneous azeotrope of $CF_3OCH_2CF_3$ and $$CClF_2CClF_2$$

exists over the range of from about 10 to about 90 mole percent of $CF_3OCH_2CF_3$. The most preferred composition of this heterogeneous azeotrope of $$CF_3OCH_2CF_3$$

and $CClF_2CClF_2$ exists over the range of 50 mole percent to 80 mole percent of $CF_3OCH_2CF_3$. The normal boiling point of the most preferred compositions is about 34° F. (1.1° C.), whereas $CF_3OCH_2CF_3$ boils at about 42° F. (5.6° C.) and $CClF_2CClF_2$ has a boiling temperature at normal pressure of 39° F. (3.9° C.). Similar to the method used in Table I above, the latent heats of vaporization in Table II were calculated from the Clausius-Clapeyron equation.

TABLE II.—COMPARISON OF $CF_3OCH_2CF_3/CClF_2CClF_2$ HETEROGENEOUS AZEOTROPE WITH $CClF_2CClF_2$(R–114)
[Evaporate at 34° F. and 14.0 p.s.i.a. Condense at 100° F.]

|  | Latent Heat of Vaporization, B.t.u./lb. mole (calc'd) | Ratio of Compression |
|---|---|---|
| $CF_3OCH_2CF_3/CClF_2CClF_2$ | 12,520 | 3.16 |
| $CClF_2CClF_2$ | 10,230 | 3.47 |

Over the entire range of heterogeneity the above higher heat of vaporization is observed to exist.

The third heterogeneous azeotrope of the invention is a mixture of bis(trifluoromethyl) ether and bromotrifluoromethane. A preferred range of compositions for this azeotrope is from about 20 to about 90 mole percent of bromotrifluoromethane (R–13B1). The most preferred range of compositions for this azeotrope is from 64 to 78 mole percent of bis(trifluoromethyl) ether and 36 to 22 mole percent of bromotrifluoromethane (R–13B1). These most preferred compositions exhibit a normal boiling temperature of about −80° F. (−62° C.) as compared to the boiling temperature of −75° F. (−59° C.) of $CF_3OCF_3$ and the boiling temperature of −72° F. (−58° C.) of R–13B1. This azeotrope provides a refrigerant that fills a gap among refrigerants, since it possesses an intermediate boiling temperature between the range −72° F. and −109° F.

The advantages demonstrated for the heterogeneous azeotrope systems in Tables I and II are also found to exist for the azeotropes of $CF_3OCF_3/CBrF_3$.

The heterogeneous azeotropes of the invention are adapted for use as refrigerants to provide advantages over existing refrigerants. The refrigerating effect is accomplished by the repeated cycle in a closed system of condensing the heterogeneous azeotropic mixture and thereafter evaporating the mixture in the vicinity of a body to be cooled.

The perfluoroaliphatic ethers, $CF_3OCF_3$, $CF_3OC_2F_5$, of the invention azeotropes are prepared by electrolyzing in anhydrous liquid hydrogen fluoride the corresponding hydrocarbon ethers and separating the product by fractional distillation as described in U.S. Patent 2,500,388.

Bromotrifluoromethane may be prepared by passing a gaseous mixture of bromine and trifluoromethane over activated chromium (III) oxide at 400° C. as described in U.S. Patent 2,937,210.

1,2-dichlorotetrafluoroethane is prepared using perchloroethylene ($C_2Cl_4$) as the reactant with hydrogen fluoride at 170° C. as described in U.S. Patent 2,478,362.

Trifluoromethyl methyl ether is produced by reacting methanol with carbonyl fluoride to yield methyl fluoroformate which when reacted with sulfur tetrafluoride yields the desired ether, $CF_3OCH_3$. (See Aldrich et al., J. Organic Chemistry, 29, 11 [1964].)

Trifluoromethyl 2,2,2-trifluoroethyl ether, $$CF_3OCH_2CF_3$$

is prepared by one skilled in the art by heating at 100° C. to 150° C. for 8 to 16 hours 2,2,2-trifluoroethanol with a molar excess of carbonyl fluoride to form 2,2,2-trifluoroethyl fluoroformate. The mass is then cooled to room temperature and the excess carbonyl fluoride vented. Thereafter, the temperature of the mass is lowered to −80° C. and 1.5 moles of sulfur tetrafluoride is added per mole of alcohol. The mass is heated under autogenous pressure at 150° C. to 200° C. for from 8 to 16 hours. The reaction mass is cooled and the desired product separated by fractional distillation.

It is to be understood that the preceding discussion is representative and that the specific embodiments exemplified may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments described herein.

The embodiments of the invention in which an exclusive property or privilege is claimed are defined as follows:

1. A heterogeneous azeotrope consisting of a mixture of trifluoromethyl methyl ether and trifluoromethyl pentafluoroethyl ether, in which the mole percent of trifluoromethyl methyl ether is within the range of about 35 to 57.

References Cited

UNITED STATES PATENTS

| | | | |
|---|---|---|---|
| 2,255,584 | 9/1941 | Hubacker | 252—67 XR |
| 2,500,388 | 3/1950 | Simons | 252—67 XR |
| 2,531,373 | 11/1950 | Waterman | 252—67 XR |
| 3,047,506 | 7/1962 | Broadley | 252—67 |
| 3,189,621 | 6/1965 | Harnik | 252—614 XR |

LEON D. ROSDOL, *Primary Examiner.*

S. D. SCHWARTZ, *Assistant Examiner.*